May 26, 1925.
L. P. HALLADAY
DIRECT SUSPENSION SHOCK ABSORBER
Filed May 8, 1922
1,539,113
2 Sheets-Sheet 1
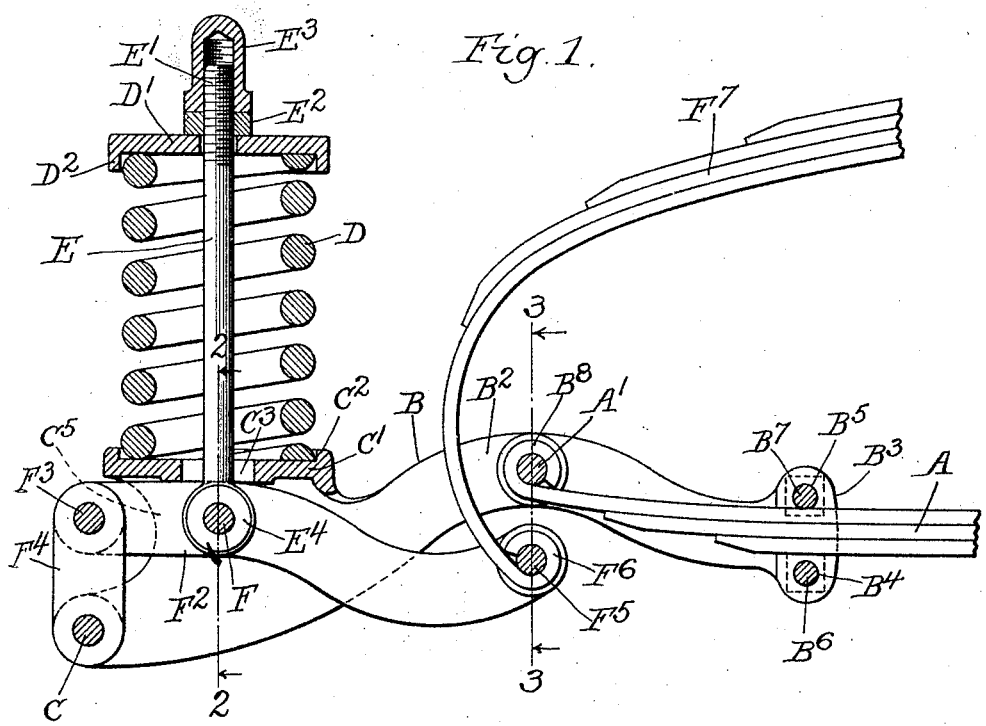
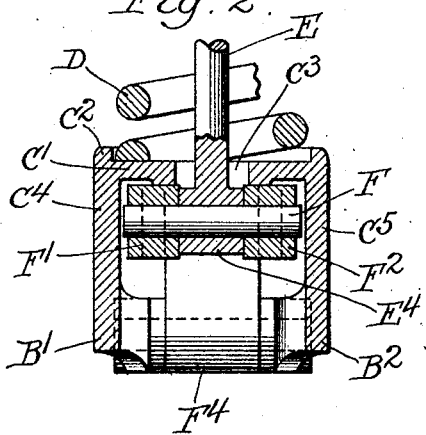
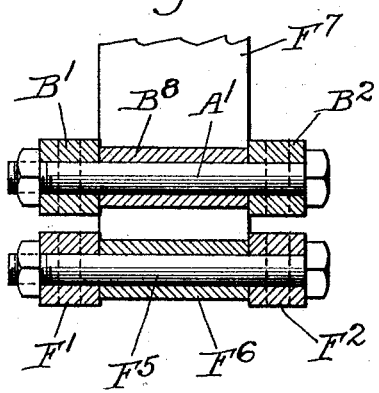
Witness
Edward T. Wray.
Inventor.
Lewis P. Halladay.
by Parker & Carter
Attorneys.

May 26, 1925.

L. P. HALLADAY

DIRECT SUSPENSION SHOCK ABSORBER

Filed May 8, 1922

Witness.
Edward T. Wray.

Inventor.
Lewis P. Halladay.
by Parker & Carter
Attorneys.

Patented May 26, 1925.

1,539,113

UNITED STATES PATENT OFFICE.

LEWIS P. HALLADAY, OF DECATUR, ILLINOIS.

DIRECT-SUSPENSION SHOCK ABSORBER.

Application filed May 8, 1922. Serial No. 559,217.

*To all whom it may concern:*

Be it known that I, LEWIS P. HALLADAY, a citizen of the United States, residing at Decatur, in the county of Macon and State of Illinois, have invented a certain new and useful Improvement in Direct-Suspension Shock Absorbers, of which the following is a specification.

My invention relates to improvements in shock absorbers for automobiles, and particularly to a direct suspension shock absorber unit adapted to be interposed between opposed semi-elliptic or three-quarter elliptic spring elements.

The invention has for its particular purpose the provision of such an element which shall operate on the leverage principle and shall provide a direct suspension from coil springs and compound levers, in addition to the yielding support furnished by the normal elliptic springs. A further object of my invention is to provide such a unit wherein the tension of the supplementary spring shall be adjustable to variations of car weight. In general terms, the object of my invention is to provide a new and improved form of direct suspension shock absorber wherein all the parts are easily manufactured and assembled, and wherein the apparatus is peculiarly simple and durable and easy to install. Other objects will appear from time to time in the course of the specification.

I illustrate my invention more or less diagrammatically in the accompanying drawings, wherein—

Figure 1 is a longitudinal section along the axis of the elliptic and the supplemental springs, showing the unit applied to three-quarter elliptic springs;

Figure 2 is a section on the line 2—2 of Fig. 1;

Figure 3 is a section on the line 3—3 of Fig. 1;

Like parts are indicated by like letters and numbers throughout the specification and drawings.

Describing first the form shown in Figs. 1, 2 and 3, A is a lower spring element through the eye of which passes the pin or bolt A', projecting at either end substantially beyond the side of the spring. Mounted thereon is the outwardly projecting spring support B, which comprises the two side elements B' and B², joined by the cylindrical connection B³, through which is threaded the pin or bolt A'. The element B projects inwardly along the spring A and its side elements B' and B² are enlarged as at B³, and perforated as at B⁴ B⁵ to admit the connecting pins or bolts B⁶ B⁷, which cross above and below the spring A and substantially limit the element B from movement or rotation in relation to the spring, although giving some slight play.

The two side elements B' and B² project outwardly beyond A' and are joined at their outer ends by a pin or bolt C. B' and B² are joined between the points A' and C by a circular platform C', which is provided with a peripheral, upwardly extending ledge C² and is centrally apertured as at C³. This platform is supported by upward lugs or projections C⁴ C⁵ from the elements B' B².

Adapted to be supported on the circular platform C' is the stout spiral spring D, the lower end of which is contained within the peripheral ledge C², and over the upper end of which is fitted the perforated cap D', having a peripheral, downwardly extending ledge D². Extending through the centrally disposed aperture of D' is the impression link E, the upper end of which is screw-threaded as at E', to receive an adjusting nut E² and a screw-threaded covering cap nut E³. The lower end of the link is provided with an eye element E⁴, through which passes the pin F, the outer ends of which engage the two side elements F' F² of a double link or lever element, the outer end of which is pivoted, as at F³, on upwardly projecting links F⁴, the lower ends of which are pivoted as at C. The link elements F' F² are connected at their inner ends as at F⁵ and are there secured to the downwardly projecting eye F⁶ of the three-quarter elliptic spring element F⁷.

Figure 4:
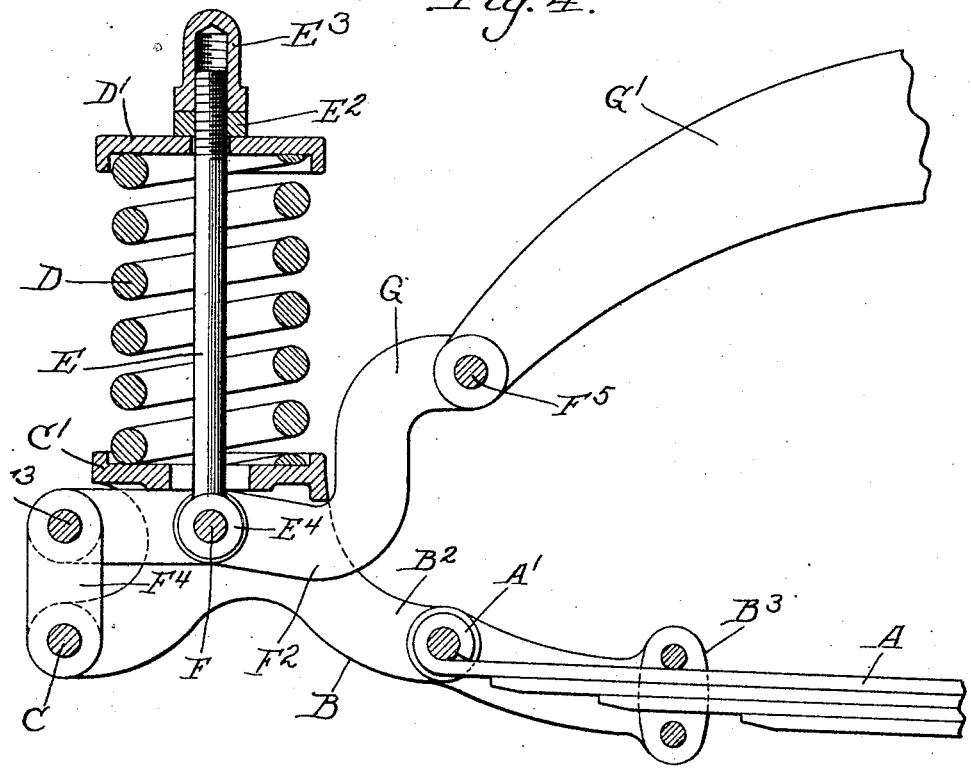
Figure 4 is a sectional view similar to Fig. 1, showing the unit applied to semi-elliptic springs.

Turning to Fig. 4, the element B is connected to the lower spring A as above described. The outwardly projecting portions B' B² are shaped somewhat differently than as shown in Fig. 1, but the operative connections with the various spring and lever parts are identical. The lever element F F', however, is upwardly curved as at G, and is secured to the outer end of the upper frame element, or semi-elliptic spring G'.

Figure 5:
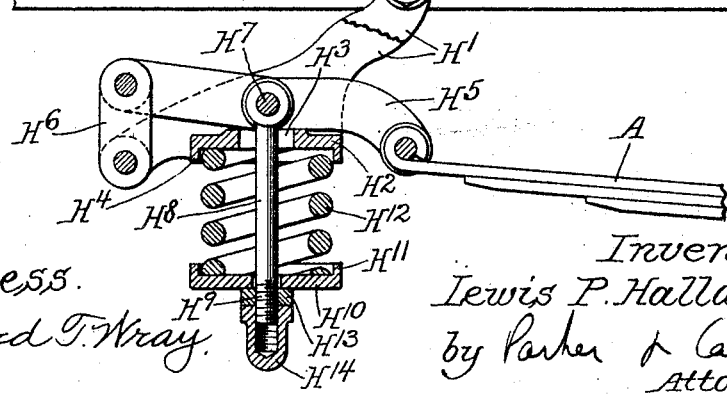
Figure 5 is a variant form particularly adapted for mounting on the front of the vehicle.

Turning to Fig. 5 a form is shown particularly adapted for mounting on the front of a vehicle. A is the lower spring element and H any suitable upper spring or frame element to be secured to an outwardly projecting member H' having on it an inverted platform H², centrally apertured as at H³ and providing with a surrounding rim H⁴. Pivoted at the outer end of the spring A is a lever H⁵ which is connected to the portion H' by the link H⁶. Pivoted to H⁷ in such a position as to overlie the aperture H³ is the pin H⁸, the outer end of which is screw threaded as at H⁹ and is secured to the cap H¹⁰ having a rim H¹¹. Confined between the cap H¹⁰ and the platform H² is the spiral spring H¹². The nuts H¹³ and H¹⁴ permit a limited adjustment of the tension of the spring.

It will be understood that while I have shown an operative device, may changes might be made in number, size, shape and relation of parts without departing from the spirit of my invention. I therefore wish that the drawings be taken as in a large sense diagrammatic.

The use and operation of my invention are as follows:

Since road shocks cause the usual elliptic springs to rebound violently, and since this rebound seriously affects the comfort of the passengers, I provide a supplemental, direct suspension spring and lever assembly which limits and largely eliminates this rebound. The supplementary unit, in the first place, lengthens the leaf springs by some six inches or more and greatly increases their resiliency. The car body and load are directly suspended from the coil springs and compound levers. The operation is on the leverage principle, and the compounding of the leverage multiplies the load-carrying capacity, so that springs of great flexibility may be used without sacrificing any required strength.

Furthermore, the supplemental coil spring may be adjusted somewhat to varying car weights, by adjusting the cap at the top by means of the screw-threaded stem or link and bolt. The supplemental spring, puts no additional strain on the leaf springs, and in fact, relieves them by introducing a soft cushion between the frame and the springs.

I claim:

1. An auxiliary spring for vehicles adapted for use with opposed leaf springs, comprising an extension from one of said springs, an apertured platform mounted thereon, a supplemental spring seated on said platform and means for compressing said supplemental spring, comprising a link connected to the top of said spring and passing through said platform and a lever pivoted to said link, a pivot link connection between the outer end of said lever and said extension, the inner end of said lever being pivoted to the opposed leaf spring.

2. An auxiliary spring for vehicles adapted for use with opposed vehicle supporting elements, comprising an extension relatively rigidly fixed to one such element, a lever pivoted to the other, a link connecting said lever and extension at their outer ends and a compression spring located between said lever and extension and beyond the ends of said vehicle supporting elements.

3. An auxiliary spring for vehicles adapted for use with opposed vehicle supporting elements, comprising an extension fixed to one such element, a lever pivoted to the other, a link connecting said lever and extension at their outer ends and yielding means between said lever and extension, comprising a perforated platform on said extension and a spring mounted thereon, and a connection between said spring and the pivoted lever.

4. An auxiliary spring for vehicles adapted for use with opposed vehicle supporting elements, comprising an extension fixed to one such element, a lever pivoted to the other, a link connecting said lever and extension at their outer ends and yielding means between said lever and extension, comprising a perforated platform on said extension and a spring mounted thereon, and a connection between said spring and the pivoted lever, comprising a pin secured to the top of said spring and pivoted to the lever.

5. An auxiliary spring for vehicles adapted for use with opposed vehicle supporting elements, comprising an extension fixed to one such element, a lever pivoted to the other, a link connecting said lever and extension at their outer ends and yielding means between said lever and extension, comprising a perforated platform on said extension and a spring mounted thereon, and a connection between said spring and the pivoted lever, comprising a pin adjustably secured to the top of said spring and pivoted to the lever.

6. An auxiliary spring for vehicles adapted for use with opposed vehicle supporting elements, comprising a relatively rigidly mounted extension from one of said elements, a lever pivoted to the other, a pivotal connection between the outer extension and the lever and adjustable yielding means interposed between said lever and extension, comprising a perforated platform on said extension, a helical spring mounted thereon, a cap engaging the top of said spring, a pin pivoted to said lever and adapted to extend through the perforations of said platform and through the center of said spring, and adjustably secured at its outer end to said cap.

7. An auxiliary spring for vehicles adapted for use with opposed vehicle supporting elements, comprising an extension fixed to one such element, a lever pivoted to the other, a link connecting said lever and extension at their outer ends and yielding means between said lever and extension, comprising a perforated platform on said extension and a spring mounted thereon, and a connection between said spring and the pivoted lever, comprising a pin secured to the outer end of said spring and pivoted to the lever.

8. An auxiliary spring for vehicles adapted for use with opposed vehicle supporting elements, comprising a relatively rigid extension from and outwardly beyond the end of one of said elements, an apertured platform mounted thereon, a supplemental spiral spring seated upon said platform and means for compressing said supplemental spring downwardly thereagainst, comprising a cap engaging the top of said spring, a rod adjustably secured to said cap, and passing through said platform, and a lever pivoted to said rod beneath the platform, the outer end of said lever being pivotally connected to said extension, and the inner end of said lever being pivoted to one of said vehicle supporting elements.

Signed at Chicago county of Cook and State of Illinois, this 1st day of May 1922.

LEWIS P. HALLADAY.